July 8, 1930.    H. B. BARBER    1,770,059
COMBUSTION CONTROL
Filed Jan. 28, 1929
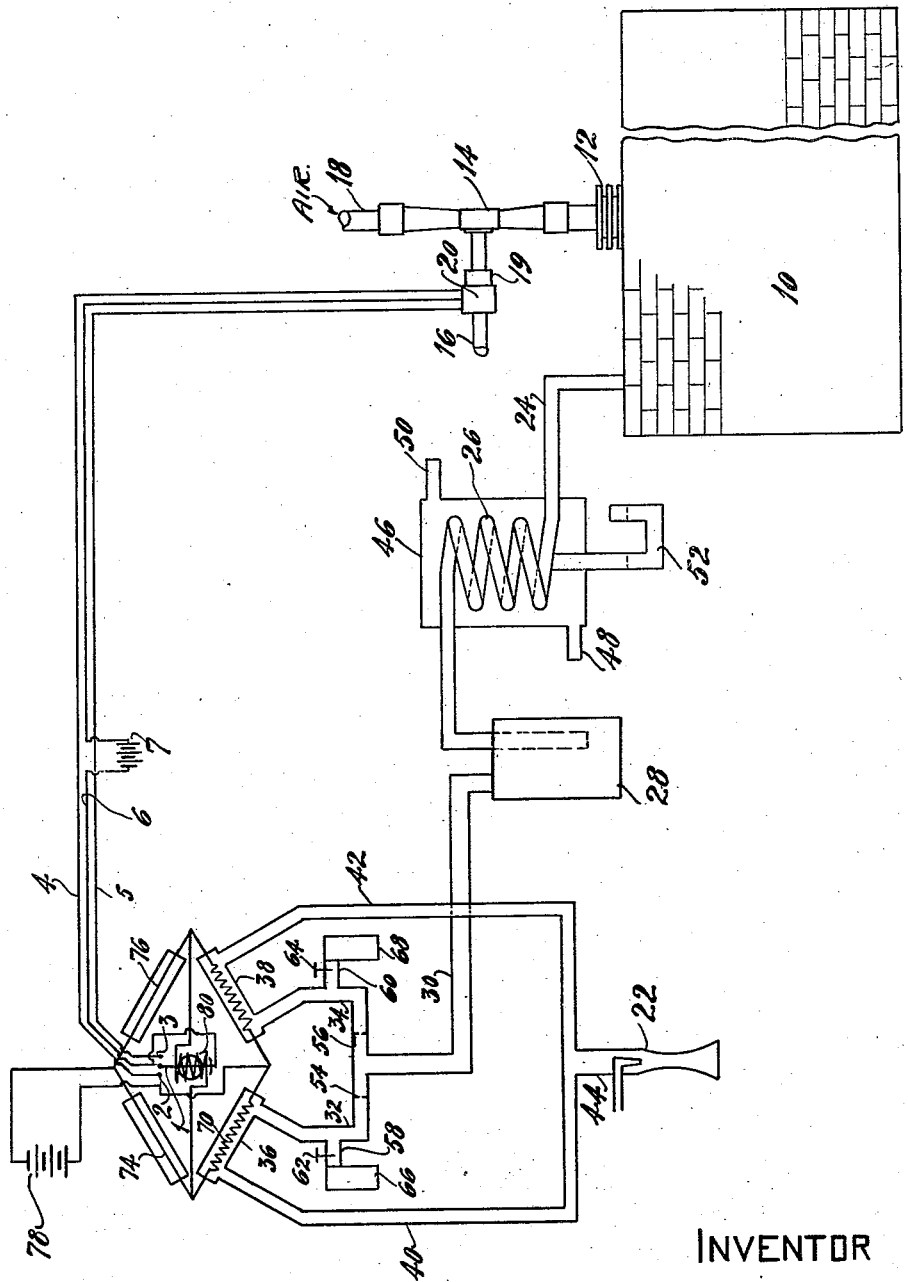
INVENTOR
H. B. BARBER.
BY Charles A. Lind
ATTORNEY Patented July 8, 1930

1,770,059

UNITED STATES PATENT OFFICE

HUGH B. BARBER, OF TOLEDO, OHIO, ASSIGNOR TO THE SURFACE COMBUSTION CO., INCORPORATED, OF TOLEDO, OHIO, A CORPORATION OF NEW YORK

COMBUSTION CONTROL

Application filed January 28, 1929. Serial No. 335,678.

This invention relates broadly to furnace control and particularly to a control in accordance with the composition of flue gas from the furnace.

The invention provides for controlling furnace combustion by causing combustion of any unconsumed element of combustion remaining in the flue gas from the furnace and utilizing the resulting increased temperature of the flue gas to control the supply of an element of combustion to the furnace. In accordance with my invention, I withdraw a current of flue gas from the furnace, divide the current into two branches or streams, add oxygen or air to one branch and a combustible to the other, pass the branch streams over wires heated to the ignition temperature of any combustible mixture in said streams, and utilize the change in electrical resistance set up in the wires by the heat of combustion of said mixture for controlling an element of combustion to the furnace. It is desirable that the current of flue gas withdrawn from the furnace should be of uniform temperature and humidity before being passed over the heated wires. I, therefore, cool the current of flue gas and relieve it of excess moisture by passing it through a water cooled condensor and to further relieve it of moisture pass the cooler gas through a moisture absorbing substance.

In the accompanying drawing which illustrates the preferred embodiment of the invention, the single figure is a diagrammatic view of a furnace and its connections showing the manner in which I preferably regulate its operation.

In the illustrated embodiment of the invention, numeral 10 indicates any type of furnace adapted to be fired by any type of fuel. For purposes of illustration there is shown a burner 12 to which a gaseous combustible mixture is supplied by a fuel gas and air mixer 14 having gas and air supply pipes 16 and 18, respectively, the air being under pressure to entrain the gas. The gas pipe has a valve 19 controlled by a reversible motor 20 which is controlled by controlling mechanism hereinafter described.

Flue gas is withdrawn from the furnace through a circuit including a suction device such as an aspirator 22 or the like. The other parts of the circuit are pipe 24, water cooled condenser 26, moisture absorber 28, pipe 30, two branch pipes 32 and 34, tubes 36 and 38, pipes 40 and 42 and suction pipe 44. The condenser is shown as a coil within a casing 46 having an inlet and outlet 48 and 50, respectively, for circulating water. Extending from the bottom of the coil is a moisture discharge pipe 52.

Each of the branch pipes 32, 34 has a flow orifice 54 (56) and a side inlet 58 (60) controlled by a valve 62 (64) for adjusting the effective size of the inlet. One inlet as 58 connects with a source 66 of combustible, as for example fuel gas, and the other inlet 60 with a source 68 of oxygen or air, both preferably being maintained at atmospheric pressure. Since the flue gas is drawn through the circuit by suction device 22, air and combustible will be drawn into the branch streams, respectively, when the valves 62, 64 controlling the inlets are open.

If oxygen is present in the flue gas from the furnace, the addition of a combustible to the stream in branch 32 will produce a combustible mixture which may be burned. Lacking oxygen in the flue gas, the addition of a combustible at said point will of course not produce a combustible mixture. If a combustible such as carbon monoxide is present in the flue gas from the furnace, the addition of oxygen or air to the stream in branch 34 will produce a combustible mixture which may be burned, whereas lacking a combustible, the addition of oxygen or air will of course not produce a combustible mixture.

Arranged within tube 36 is a wire 70 and within tube 38 a wire 72 both adapted to be heated to the ignition temperature of any combustible mixture which may be present in the flue gas streams entering said tubes from branches 32, 34. These wires are preferably legs of a Wheatstone bridge the other legs of which are indicated at 74 and 76. Wires 74 and 76 are shown enclosed in sealed tubes to exclude resistance disturbing influences. 78 indicates a source of electric energy for heating the wires 70 and 72. Connected across the bridge is a galvanometer 80. If now the addition of an element of combustion as aforesaid to the one or the other of the flue gas streams passing over the heated wires has produced a combustible mixture, the latter will burn about the wire over which it passes. The change in electrical resistance in the wire due to increase of its temperature will unbalance the bridge and cause the galvanometer 80 to be actuated, the needle 1 thereof swinging to one side or the other depending on which wire has its resistance changed. On either side of the neutral positions of the galvanometer needle 1 are two contacts 2, 3 with which the needle is adapted to make contact. Leading from these contacts to the valve controlling motor 20 are wires 4, 5. In permanent electrical connection with the galvanometer needle is a wire 6 which leads to said motor and which constitutes the other half of both circuit wires 4 and 5. A source of energy for operating the motor is indicated at 7, in series with the wire 6. It will now be readily understood that the motor will be rotated in one direction or the other depending on whether the galvanometer needle makes contact with 1 or 2, and that the direction of the movement of the needle depends on which of the heated wires 36, 38 has its resistance changed by burning of combustible mixture as aforesaid. It will of course be understood that either or both elements of combustion may be controlled by the controlling system to control the relative amounts of fuel and air admitted to the furnace.

The flow orifices 54 and 56 are of the same size and the inlets 58 and 60 for combustible and oxygen, respectively, are adjusted to meet the capacities of said orifices.

While it is preferred that the heated wires form the legs of a Wheatstone bridge, other types of circuits may be employed without departing from the spirit of the invention. The controlling system between the galvanometer and the means for controlling the relative amounts of the elements of combustion delivered to the furnace may obviously be of any suitable type, the type shown being merely illustrative.

What is claimed is:

1. In a method of controlling furnace combustion by regulating the relative amount of the elements of combustion supplied to the furnace in accordance as flue gas from the furnace contains oxygen, the steps of obtaining a regulating effect consisting in modifying a stream of said flue gas by the addition of a gaseous combustible, passing the modified stream over a wire heated to the ignition temperature of any combustible mixture resulting from the addition of combustible as aforesaid, and utilizing change in resistance of the wire resulting from burning such mixture about the wire for obtaining a regulating effect on the elements of combustion supplied to the furnace.

2. In a method of controlling furnace combustion by regulating the relative amounts of the elements of combustion supplied to the furnace in accordance as flue gas from the furnace contains oxygen or combustibles, the steps of obtaining a regulating effect consisting in modifying two streams of said flue gas by the addition of a supporter of combustion to the one and a gaseous combustible to the other stream, passing the modified streams over wires heated to the ignition temperature of combustible mixture resulting from the addition of the elements of combustion as aforesaid, and utilizing the change in resistance of the wires resulting from burning such mixture about the wires for obtaining the desired regulating effect on the elements of combustion supplied to the furnace.

3. In combination, a Wheatstone bridge, a source of electric energy for heating two legs of the bridge to the ignition temperature of a mixture of gaseous combustible and oxygen, means for delivering to each of said legs an individual stream of gaseous products of combustion, means for introducing oxygen into one of said streams and a combustible into the other, and means connected across said bridge responsive to the change in resistance set up in bridge due to burning of combustible mixture.

4. In combination, two wires, means for heating the wires to the ignition temperature of gaseous combustible mixtures passed thereover, means for delivering a stream of flue gas from a furnace to each wire, means for introducing a combustible into one of said streams and a supporter of combustion in to the other stream, means responsive to differential change of electric resistance of the wires, and means responsive to said change for controlling the relative amounts of the elements of combustion from which said flue gas is formed.

In testimony whereof I affix my signature.

HUGH B. BARBER.